United States Patent Office 3,642,878
Patented Feb. 15, 1972

3,642,878
METHOD OF PRODUCING UNSATURATED ESTERS
Henry O. Mottern, Far Hills, and James P. Russell, Berkeley Heights, N.J., assignors to Air Products and Chemicals, Inc., Allentown, Pa.
No Drawing. Continuation of application Ser. No. 649,844, June 29, 1967. This application Dec. 22, 1969, Ser. No. 883,674
Int. Cl. C07c *69/52*
U.S. Cl. 260—497 A          9 Claims

ABSTRACT OF THE DISCLOSURE

Unsaturated esters of organic acids are produced by contacting a lower alkene and an organic acid in the vapor phase in admixture with oxygen in the presence of a Group VIII or a Group 1–B metal chloride, cupric chloride, and an alkali metal bromide or chloride at a temperature of 100 to 160° C.

---

This application is a continuation of application Ser. No. 649,844, filed June 29, 1967, now abandoned.

This invention relates to the production of organic compounds, particularly unsaturated esters of organic acids. More specifically this invention relates to an improved method for the preparation of unsaturated esters of acetic acid, especially vinyl acetate.

In recent years there has been a substantial increase in the demand for unsaturated esters of organic acids, particularly vinyl acetate in a variety of fields such as the preparation of polymers, copolymers and resins from these polymers. In addition, these esters have been finding increased application in the synthesis of drugs and as chemical intermediates, such as acetylating agents. The increased demands have led to many attempts to produce these esters in high yields by economical and efficient processes. While it is not limited thereto, the present process will be discussed and illustrated by the preparation of vinyl acetate.

Vinyl acetate has been prepared commercially by the addition of acetic acid to acetylene in the presence of catalysts such as mercurial salts. It has also been prepared by conversion of ethylene to acetaldehyde by known methods and then adding acetic anhydride thereto to form ethylidene diacetate which can then be split to give vinyl acetate and acetic acid. The method starting from acetylene is fairly expensive due to the relatively high cost of the initial material. The method starting from ethylene involving conversion to acetaldehyde, addition to acetic anhydride and splitting to form vinyl acetate and acetic acid has the distinct disadvantage of being a multi-stage process.

More recently efforts have been made to obtain vinyl acetate from ethylene, a relatively inexpensive starting material, in a simpler manner than has hitherto been possible. Liquid phase processes for the preparation of vinyl acetate by the oxidation of ethylene in contact with a catalyst solution comprising an aqueous acetic acid reaction medium that contains a Group VIII noble metal catalyst and other co-catalysts or activity promoters have been proposed. Such processes, however, have the disadvantage of consuming large quantities of the Group VIII noble metal catalyst, the use of hydrogen acceptors such as benzoquinone which is difficult to reform by oxidation of the quinhydrone formed and the formation of various high boiling products. The high boiling products not only represent a loss of raw materials but also are higher boiling than the acetic acid solvent and therefore accumulate therein.

It has also been proposed to prepare unsaturated esters by reacting unsaturated organic compounds such as ethylene, an organic acid such as acetic acid and oxygen or an oxygen-containing gas in gas phase and in the presence of a suitable catalyst. Such processes are disclosed, for example, in the Robinson U.S. Pat. No. 3,190,912, issued June 22, 1965 and Asahi French Pat. No. 1,371,111, issued July 20, 1964. While these gas or vapor phase processes overcome many of the problems that have been encountered in the liquid phase processes they also have presented problems of their own, particularly the loss of the copper component of the catalyst.

It is the object of this invention to provide an improved process for the preparation of unsaturated esters.

It is another object of this invention to provide an improved process for the preparation of unsaturated esters by a continuous, catalytic, gas-phase process.

It is a further object of this invention to provide an improved process for the preparation of vinyl acetate by the reaction of ethylene, acetic acid and oxygen or oxygen containing gas in a continuous, catalytic, gas-phase process.

These and other objects will appear more clearly from the detailed description which follows.

It has now been found that a vapor phase, catalytic process for the production of vinyl acetate based on ethylene, acetic acid and air can be more effectively carried out if the $PdCl_2$-$CuCl_2$ catalyst is modified by the addition of potassium bromide thereto. Without the potassium bromide the catalyst loses copper continuously, fouls rapidly and can not be easily regenerated. The potassium bromide-modified catalyst has a slightly lower initial activity but does not lose copper, does not foul as rapidly and can be readily regenerated by steaming at 250° C. In addition, the modified catalyst yields a better product mix.

The starting material used may be any lower alkene such as ethylene, propylene, butene-1, or isobutylene or mixtures thereof.

The organic acid which is reacted with the alkenes to produce the desired unsaturated esters may be formic, acetic, chloroacetic, phenyl acetic, propionic or isobutyric acid or dicarboxylic acids such as adipic acid. Acetic acid is the preferred acid and desirably is employed in concentrated form, for example as 75–90 percent acid or as glacial acetic acid.

The catalysts used in the oxyacetylation in accordance with the present invention are preferably supported upon a suitable adsorptive substrate such as silica gel, activated alumina, carbon, and the like. Methods for the preparation of the catalysts will readily occur to those skilled in this art and accordingly the following method for the preparation of the catalyst is purely illustrative.

400 cc. of 60–100 mesh activated carbon was poured into a 500 ml. graduated cylinder and tapped down until no further settling was observed. The substrate volume was then readjusted to 400 cc. and the substrate weighed (195–200 g.). This was then slowly added with agitation to the catalyst solution which consisted of 33 g. of $PdCl_2$, 33 g. of $CuCl_2 \cdot 2H_2O$ and 2.0 g. of KBr dissolved in 500 cc. of 5% aqueous HCl. The water was then evaporated off for 48 hours in a forced draft oven set at 95° C. The catalyst was screened through a 60 mesh sieve to break up lumps and agglomerated particles and dried in a fluidized bed at 150° C. for one hour in a stream of nitrogen.

The catalysts preferably used in accordance with the present invention contain from about 1 to about 30 wt. percent, preferably about 5 to 15 wt. percent $PdCl_2$, from about 1 to about 30 wt. percent preferably 5 to 15 wt. percent $CuCl_2$ and from 1 to 10 wt. percent, preferably .75 to 1.0 wt. percent KBr. Instead of palladium chloride, chlorides of other Group VIII metals and Group 1–B metals can be used, e.g. chlorides of gold, platinum, iridium, ruthenium and rhodium.

The amounts of reactants charged to the catalyst bed may vary from 45 to 85 vol. percent alkene, 5 to 45 vol. percent organic acid and 5 to 15 vol. percent oxygen. In the preparation of vinyl acetate the preferred ratio of ethylene:acetic acid:oxygen is 6.5:2.5:1.0. The rate of flow of reactants to the catalytic reactor should equal or exceed the minimum velocity required to fluidize the catalyst.

The reaction temperature should be in the range of from about 100 to 150° C., preferably 140–150° C., since lower temperatures cause excessive aldol type condensation reactions on the catalyst bed and higher temperatures promote deactivation of the catalyst and by-product formation. The reaction is most advantageously and preferably carried out at atmospheric pressure. However, both sub-atmospheric and super-atmospheric pressures can be employed if desired. Generally pressures within a range of 0.1 to 10 atmospheres are suitably used.

A series of experiments were carried out in the following equipment. The reactor consisted of a straight 2 in. by 36 in. Pyrex tube fitted at the bottom with a 10 mm. ball check valve acting as a gas inlet jet. On top of the reactor tube was a reactor head equipped with a gas outlet tube leading to a cyclone separator. A piece of 8 mm. Pyrex tubing extending from the bottom of the cyclone separator to within 2 in. of the bottom of the reactor tube was provided for returning solid catalyst particles from the separator to the reactor. The lower 24 in. of the reactor tube was heated in a 2300 watt tube furnace mounted vertically and controlled by a temperature controller activated by a movable thermocouple placed in a thermocouple well which extended to 0.5 in. from the bottom of the reactor tube. The cyclone separator was provided with suitable heating means and it as well as the unheated upper portion of the reactor tube was covered with fiberglass insulation to maintain the reaction products at the desired temperature. Apparatus leading to the reactor consisted of calibrated rotameters for measuring the flow of nitrogen, air, hydrogen and ethylene. The air supply discharged directly into the bottom of the reactor and the other gases were manifolded with the discharge tube from the manifold going into the bottom of the reactor. Acetic acid for the reaction was supplied to a vaporizer consisting of a 1 in. by 14 in. Pyrex tube filled with 4 mm. glass beads arranged in a 500 watt tube furnace provided with a controller activated by a thermocouple located at the discharge end of the vaporizer tube which was connected to the gas manifold near the reactor.

The apparatus following the reactor consisted of: (1) a Pyrex coil water condenser and receiver for collecting condensable vapors such as acetic acid, $H_2O$ and ester, (2) a Pyrex coil post-receiver condenser to minimizer carryover of condensable vapor, (3) two gas bleed lines leading to the gas chromatographs used to analyze the effluent gas stream, (4) a caustic scrubber to remove acetic acid from the gas streams, and (5) a wet test meter to measure the effluent gas volume.

In the several experimental runs, the reactor tube was charged with 400 cc. of catalyst that had a minimum fluidization velocity of 150 liter/liter/hr. The catalyst bed was fluidized with a stream of nitrogen at a flow of 175 liters/hr. The reactor was then heated to 150° C. and hydrogen was introduced at 175 liters per hour and the nitrogen flow was then stopped. The catalyst was reduced for 5 hours at 150° C. and the $N_2$ flow was restarted and the $H_2$ flow was stopped. The reactor was then cooled or heated to the run temperature and held there for 1 hour while the vaporizer was heated to 150° C. The acetic acid flow was then begun and the flow calibration checked with a stopwatch. The hydrocarbon feed was then started and after 2 min. the air feed was started. After 10 min. the $N_2$ flow was stopped and the system run until the condensate volume approached the feed volume (2.5–3 hr.). Gas samples were then started and taken hourly for a 3 hr. period. The liquid condensate for the 3 hr. period was then weighed and analyzed by gas chromatography, and the volume of effluent gas, (as measured by the wet test meter) read and recorded.

Re-reduction of the catalyst in an effort to effect regeneration after use was done as described above for the original reduction procedure. Steam regeneration of the used catalyst was carried out as follows. The acetic acid feed system was disconnected from the vaporizer and replaced with a similar system containing distilled water. The vaporizer was heated to 200° C. and the reactor to 250° C. while fluidizing the catalyst bed with $N_2$. The water was then pumped in at a rate of 0.75–1.0 ml./min. This was continued until the condensate was essentially free of aldol as detected by odor (2–3 hr.). The entire system was then purged with $N_2$ at 200 liters/hr. for one hour to remove all traces of water.

A series of runs were made in the equipment described above at 100° C. and at a space velocity of 175 liter/liter/hr. with a ratio of ethylene:acetic acid:oxygen (as air) of 6.5:2.5:1.0, using as catalyst 12.7% $PdCl_2$ and 12.7% $CuCl_2$ deposited on 40–100 mesh activated carbon. These runs took 2–3 hrs. to reach flow equilibrium apparently due to the adsorption of acetic acid on the high surface area catalyst support. The first three hours after equilibration was the period of highest activity giving ethylene conversions (to a 2:1 mixture of vinyl acetate and acetaldehyde) of 30–40% based on $O_2$ fed. The conversion then dropped off over a period of 24 hours to 9–10%. Attempts to reactivate the catalyst by retreatment with $H_2$ at 150° C. for 5 hrs. or by steaming at 200–250° C. were generally unavailing.

The foregoing runs were repeated at 100° C. except that the catalyst included 1% KBr. The conversions were substantially the same as those obtained in the previously-described experiments. However, unlike the previous experiments, the catalyst could be reactivated. Thus, steam reactivation of the catalyst was carried out at 200° to 250° C. This resulted in a restoration of activity to a conversion level of 20–22%. No reaction of the catalyst to form CO and $H_2$ was observed. The aqueous condensate smelled strongly of acetic acid and aldol. Gas chromatography of the condensate showed $H_2O$ and acetic acid as major components and a trace component having the same retention time as aldol. It is probably that the loss of activity is due to the formation of aldehyde condensation products which are not carried out of the reactor at the reaction temperature. No evidence of loss of Pd or Cu salts was found after 72 hrs. of operation.

A series of runs were then made to determine the effects of temperature on the reaction. The best temperature for the Pd-Cu-KBr catalyst was found to be 150° C. At this temperature the ethylene conversion was 31.4% and after 9 hours of running was still at 30.3%. The ratio of vinyl acetate to acetaldehyde in these runs was 2:1, and 10% of the $O_2$ was converted to $CO_2$. Runs were also made at 200°, 175° and 125° C. At 200° C. all of the $O_2$ was converted to $CO_2$. At 175° C. more than 50% of the $O_2$ was converted to $CO_2$ and at 125° C., the catalyst activity dropped off as rapidly as in the 100° runs, but the catalyst could be reactivated by steaming at 200° C. or above. When the reaction is carried out at 140–150° C. the catalyst can be reactivated to its initial activity, e.g. 40% conversion, by steaming at 200° C. or above.

It is further to be understood that various changes and modifications may be made in the process above-described without departing from the scope of the present invention, as defined in the appended claims and it is intended, therefore, that all matter contained in the foregoing description shall be interpreted as illustrative only and not as limitative of the invention.

We claim:
1. A process for the production of unsaturated esters which comprises the steps of (1) contacting a lower alkene and an alkanoic acid in the vapor phase in admixture with oxygen with a catalyst consisting essentially of cupric chloride, a metal chloride selected from the group consisting of palladium chloride, platinum chloride, iridium chloride, ruthenium chloride and rhodium chloride, and potassium bromide deposited upon a solid substrate at temperatures of from about 100–150° C. and at pressures of from about 0.1 to 10 atmospheres, (2) interrupting step (1), (3) steam regenerating said catalyst at a temperature of at least 200° C., and (4) continuing step (1).

2. A process for the production of unsaturated esters which comprises the steps of (1) contacting a lower alkene and an alkanoic acid in the vapor phase in admixture with oxygen with a catalyst consisting essentially of PdCl, $CuCl_2$ and KBr deposited upon a solid substrate at temperatures of about 100–150° C. and at pressures of from about 15 to 25 p.s.i.g., (2) interrupting step (1), (3) steam regenerating said catalyst at a temperature of at least 200° C., and (4) continuing step (1).

3. The process as defined in claim 1, wherein the lower alkene is ethylene.

4. The process as defined in claim 1, wherein step (1) comprises contacting ethylene and acetic acid in the vapor phase in admixture with oxygen with a fluidized catalyst consisting essentially of cupric chloride, palladium chloride and potassium bromide deposited upon activated carbon.

5. The process as defined in claim 1, wherein the temperature is about 140–150° C.

6. The process as defined in claim 2, wherein the lower alkene is ethylene.

7. The process as defined in claim 2, wherein the lower alkene is ethylene and the organic acid is acetic acid.

8. The process as defined in claim 4, wherein the ratio of ethylene:acetic acid:oxygen is 6.5:2.5:1.0.

9. The process as defined in claim 7, wherein the ratio of ethylene:acetic acid:oxygen is 6.5:2.5:1.0.

References Cited

UNITED STATES PATENTS

| 3,190,912 | 6/1965 | Robinson | 260—497 |
| 3,277,159 | 10/1966 | Schaeffer | 260—497 A |
| 3,433,732 | 3/1969 | Leaman | 252—411 R |

FOREIGN PATENTS

| 615,596 | 9/1962 | Belgium | 260—497 |
| 618,071 | 9/1962 | Belgium | 260—497 |

OTHER REFERENCES

Dollimore et al.: J. Chem. Soc. (1962), pp. 960–965.

LORRAINE A. WEINBERGER, Primary Examiner

R. D. KELLY, Assistant Examiner

U.S. Cl. X.R.

252—411 R; 260—476 R, 485 N, 487